(12) United States Patent
Kimura

(10) Patent No.: US 7,444,109 B2
(45) Date of Patent: Oct. 28, 2008

(54) PRINTED MATTER PREPARATION DEVICE, PRINTING DATA TRANSMISSION METHOD AND APPARATUS, AND RECORDING MEDIUM

(75) Inventor: Nobuyuki Kimura, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1048 days.

(21) Appl. No.: 10/800,205

(22) Filed: Mar. 12, 2004

(65) Prior Publication Data

US 2004/0263869 A1     Dec. 30, 2004

(30) Foreign Application Priority Data

Jun. 26, 2003  (JP)  ............... 2003-182791

(51) Int. Cl.
*G03G 15/00* (2006.01)
(52) U.S. Cl. ......................... 399/382; 399/81
(58) Field of Classification Search ......... 399/381–382, 399/81
See application file for complete search history.

(56) References Cited

U.S. PATENT DOCUMENTS 6,782,218 B2 *   8/2004   Sekiguchi et al. ............. 399/81

* cited by examiner

*Primary Examiner*—Hoang Ngo
(74) *Attorney, Agent, or Firm*—Lucas & Mercanti, LLP

(57) ABSTRACT

A room for selection of a measure is given to a user before execution of printing in a case where an extra tab sheet is generated in preparing a printed matter in which a plurality of tab sheets constituting one set are inserted in designated page positions. For this, insertion information input means 101 inputs insertion information indicating the page positions of the tab sheets to be inserted in the printed matter, and constituting sheet number acquisition means 102 acquires the number of tab sheets constituting one set. Judgment means 104 judges whether or not the extra tab sheets are generated when the printed matter is prepared from the number of tab sheets inserted in a case where the printed matter is printed in accordance with the set insertion information and the number of tab sheets constituting one set, and notification means 105 notifies a user that the extra tab sheets are generated before start of the printing in a case where the extra tab sheets are generated.

6 Claims, 7 Drawing Sheets

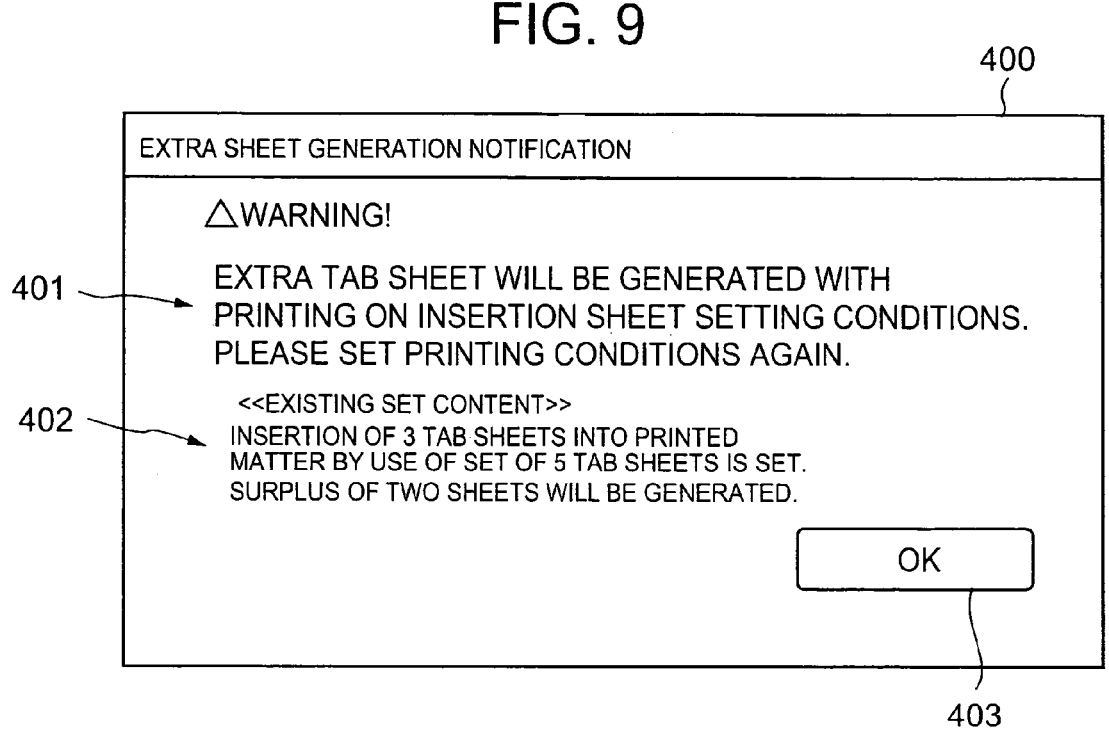
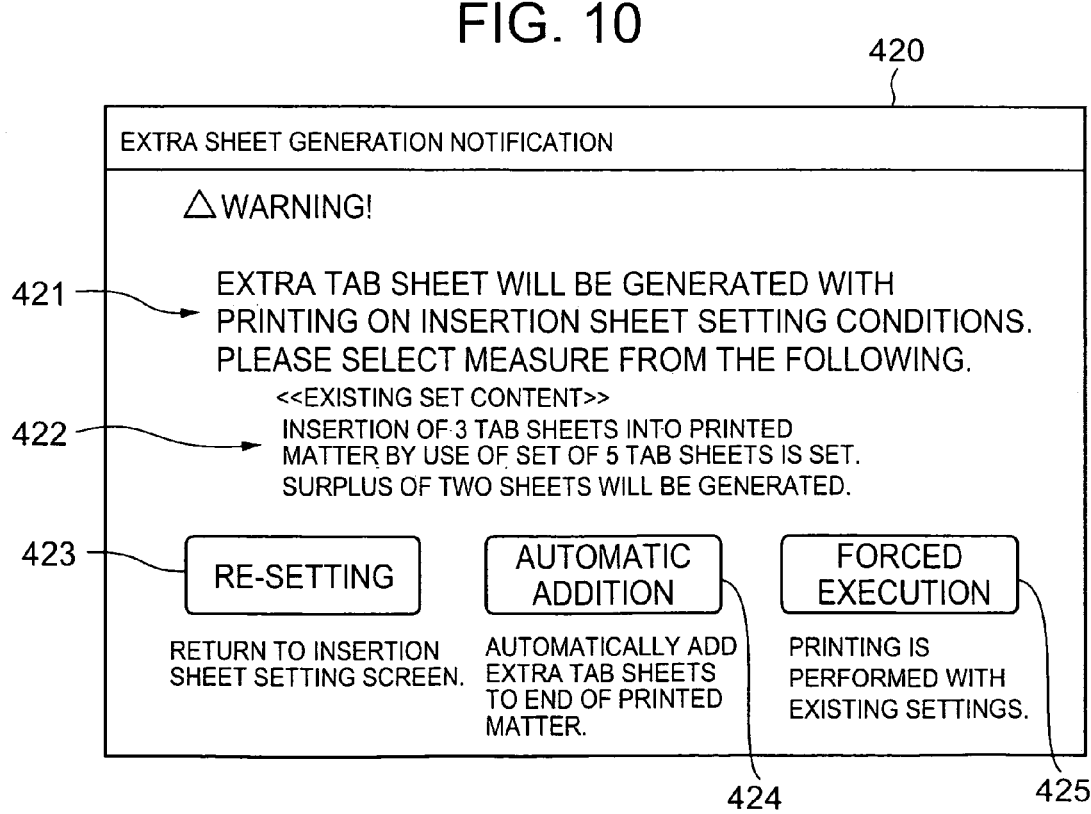

PRINTED MATTER PREPARATION DEVICE, PRINTING DATA TRANSMISSION METHOD AND APPARATUS, AND RECORDING MEDIUM

BACKGROUND OF THE INVENTION

1. Field of the Invention

The present invention relates to a device for preparing a printed matter while inserting a special sheet such as a tab sheet for chapter dividing between pages, a printing data transmission method and apparatus for preparing the printed matter, and a recording medium readable by a computer, in which a printing procedure is recorded.

2. Description of the Related Art

To print a printed matter constituted of a plurality of chapters, use has been made of image forming devices having a function of inserting a special sheet for chapter dividing in a designated page position while preparing the printed matter, such as a printer and a copying machine. For the special sheet, a tab sheet for use as an index sheet for chapter dividing as shown in FIG. 1, color sheets different from one another in color, and the like are used.

FIG. 1 shows one example of a tab paper 900 comprising one set including five sheets.

The tab sheets are set in a sheet feed section of the image forming device which is different from that for recording sheets for use in usual printing, for example, a manual feed tray. In an image forming device, a sheet feeder is switched to the sheet feed section in which the tab sheets are set only when a page designated as an insertion position of the tab sheet is printed, and chapter numbers or the like ate printed on tabs 911 to 913 of fed tab sheets 901 to 903 to prepare a printed matter 920 shown in FIG. 2. For tab sheets 901 to 905 constituting one set, as shown in FIG. 1, positions of tabs 911 to 915 are different from one another, and an arrangement order of the sheets 901 to 905 in one set is determined. When the tab sheet is inserted between the pages of the printed matter, it is usual to use the sheets from the tab sheet 901 having a top arrangement order. In the image forming device, a printing position of the chapter number or the like is changed in accordance with the tab position based on this assumption.

For example, when a setting is made so as to use one set of five sheets 900 shown in FIG. 1, the image forming device adjusts the printing position onto the tabs 911 to 915 on the assumption that a length of each of the tabs 911 to 915 is ⅕ of a vertical length of each of the tab sheets 901 to 905, the tab positions of the fed tab sheets 901 to 905 change for each tab in order toward a lower end from an upper end of the sheet, and the position returns to the upper end again when reaching the lower end.

Additionally, in a case where the number of tab sheets to be inserted in the printed matter (e.g., three sheets) is not an integer times that of tab sheets constituting one set (e.g., five sheets), when the printing of the next printed matter is started as it is after printing the printed matter, or the printing of a plurality of sheets is set and, executed, the tab sheets are fed in order from the tab sheet whose arrangement order is not the top in one set in the next printed matter or second and subsequent printed matters. Therefore, the assumed tab position in the image forming device differs from the tab position of the actually fed tab sheet, and the printing onto the tab fails.

To solve the problem, an image forming device has been proposed in which it is calculated from the number of tab sheets inserted in the printed matter and the number of tab sheet constituting one set whether or not an extra tab sheet is generated, and any extra tab sheet is expelled if generated (refer to Japanese Patent Application Laid-Open No. 4-361083, for example,).

In a case where the image forming device detects the generation of the extra tab sheet and expels this sheet, a user does not recognize the generation of the extra tab sheet until the sheet is expelled. Therefore, even if the user can take measures such as replacement with another set of tab sheets different in the number of sheets constituting one set, the measures cannot be selected beforehand, and the user cannot necessarily take an optimum measure.

Moreover, since the generation of extra tab sheets is detected and these sheets are expelled on the side of the image forming device, an existing image forming device that does not have such function cannot solve the problem related to the generation of the extra tab sheets.

SUMMARY OF THE INVENTION

The present invention has been developed in consideration of the problems of the related art, and an object thereof is to provide a preparation device of a printed matter, in which special sheets such as a plurality of tab sheets constituting one set are inserted in a designated page position, and a printing data transmission apparatus and method in which a room for selection of a measure can be given to a user in a case where extra special sheets are generated in the preparation of the printed matter. Further object of the present invention is to provide a recording medium readable by a computer, in which a procedure for preparing the printed matter is recorded.

The scope of the present invention for achieving the objects lies in the following inventions.

A printing data transmission apparatus according to a first mode for carrying out the present invention is a printing data transmission apparatus which transmits printing data to a printed matter preparation device to prepare a printed matter constituted of a plurality of pages while inserting a special sheet, a plurality of the special sheets constituting one set, into a designated page position sheet by sheet, the apparatus comprising: insertion information input means into which insertion information indicating the page position of the special sheet to be inserted in the printed matter is input; judgment means which judges whether or not an extra special sheet is generated if the printed matter is prepared in accordance with the insertion information and the number of special sheets constituting one set; and notification means which notifies that the extra special sheet is generated, when the judgment means judges that the extra special sheet is generated.

The above-described mode further comprises acquisition means for acquiring the number of special sheets constituting one set, and the judgment means judges whether or not the extra special sheet is generated when the printed matter is prepared in accordance with the number of special sheets constituting one set acquired by the acquisition means.

Further in the mode, the notification means notifies the generation of the extra special sheet before the printing data is transmitted to the printed matter preparation device, when the judgment-means judges the generation of the extra special sheet.

Further in the mode, the judgment means judges whether or not the extra special sheet is generated when the printed matter is prepared based on the number of special sheets inserted in a case where the printed matter is printed in accordance with the insertion information and the number of special sheets constituting one set.

Further in the mode, the notification means includes display means, and the display means displays information indicating that the extra special sheet is generated, when the judgment means judges that the extra special sheet is generated.

Further in the mode, the notification means includes display means, and the display means displays information indicating a request for re-input of the insertion information.

Further in the mode, the notification means includes display means, and the display means displays information indicating a request for re-setting of the number of special sheets constituting one set.

Further in the mode, the notification means notifies that automatic addition is performed to add the extra special sheet to the end of the printed matter.

Further in the mode, the notification means notifies that the printing is forced to be executed even when the extra special sheet is generated.

Furthermore, the mode further comprises: selection acceptance means for accepting selection from a plurality of choices including at least one of re-input of the insertion information, automatic addition to add the extra special sheet to the end of the printed matter, and forced execution of the printing, when the judgment means judges that the extra special sheet is generated.

Additionally, the mode further comprises: additional information generation means for processing the printing data for preparing the printed matter so as to add the extra special sheet to the end of the printed matter, when the plurality of choices include at least the automatic addition and the selection acceptance means selects the automatic addition.

Further in the mode, the display means displays information indicating a request for selection from a plurality of choices including at least one of re-input of the insertion information, automatic addition to add the extra special sheet to the end of the printed matter, and forced execution of the printing, when the judgment means judges that the extra special sheet is generated.

A printed matter preparation device according to a second mode for carrying out the present invention is a printed matter preparation device which prepares a printed matter constituted of a plurality of pages while inserting a special sheet, a plurality of the special sheets constituting one set, into a designated page position sheet by sheet, the device comprising: insertion information input means into which insertion information indicating the page position of the special sheet to be inserted in the printed matter is input; judgment means which judges whether or not an extra special sheet is generated if the printed matter is prepared in accordance with the insertion information and the number of special sheets constituting one set; notification means which notifies that the extra special sheet is generated, when the judgment means judges that the extra special sheet is generated; and printed matter preparation means for preparing the printed matter in accordance with the insertion information.

A printed matter preparation device according to a third mode for carrying out the present invention is a printed matter preparation device which prepares a printed matter constituted of a plurality of pages while inserting a special sheet, a plurality of the special sheets constituting one set, into a designated page position sheet by sheet, the device comprising: insertion information input means into which insertion information indicating the page position of the special sheet to be inserted in the printed matter is input; judgment means which judges whether or not an extra special sheet is generated if the printed matter is prepared in accordance with the insertion information and the number of special sheets constituting one set; notification means which notifies that the extra special sheet is generated, when the judgment means judges that the extra special sheet is generated; and printing means for forming an image on the special sheet in accordance with the insertion information.

A recording medium according to a fourth mode for carrying out the present invention is a recording medium readable by a computer, in which a program is recorded for preparing a printed matter constituted of a plurality of pages while inserting a special sheet, a plurality of the special sheets constituting one set, into a designated page position sheet by sheet by a printed matter preparation device and for executing: a step of acquiring insertion information indicating the page position of the special sheet to be inserted into the printed matter; a step of judging whether or not an extra special sheet is generated if the printed matter is prepared in accordance with the insertion information and the number of special sheets constituting one set; and a step of notifying that the extra special sheet is generated, when it is judged that the extra special sheet is generated.

The fourth mode further includes a step of acquiring the number of special sheets constituting one set, and it is judged whether or not the extra special sheet is generated when the printed matter is prepared in accordance with the number of special sheets constituting one set acquired in the acquiring step.

In the fourth mode, the notifying step is performed before transmitting the printing data to the printed matter preparation device, when it is judged that the extra special sheet is generated.

In the fourth mode, the notifying step is performed before starting the printing of the printed matter.

In the fourth mode, in the judgment step, it is judged whether or not the extra special sheet is generated when the printed matter is prepared based on the number of special sheets to be inserted in a case where the printed matter is printed in accordance with the insertion information and the number of special sheets constituting one set.

In the fourth mode, the notification step is performed by allowing the display means to display information indicating that the extra special sheet is generated In the fourth mode, the notification step allows the display means to display information indicating a request for re-input of the insertion information.

In the fourth mode, the notification step allows the display means to display information indicating a request for re-setting of the number of special sheets constituting one set.

In the fourth mode, the notification step notifies that the automatic addition is performed to add an extra recording sheet to the end of the printed matter.

In the fourth mode, the notification step notifies that the printing is forced to be executed even when the extra special sheet is generated.

The fourth mode further includes a step of accepting selection from a plurality of choices including at least one of re-input of the insertion information, automatic addition to add an extra special sheet to the end of the printed matter, and forced execution of the printing, when it is judged that the extra special sheet is generated.

The fourth mode further includes a step of processing the printing data for preparing the printed matter so as to add the extra special sheet to the end of the printed matter, when the plurality of choices include at least the automatic addition and the automatic addition is selected in the acceptance step.

In the fourth mode, the notification step allows the display means to display information indicating a request for selection from the plurality of choices including at least one of the re-input of the insertion information, the automatic addition to add the extra special sheet to the end of the printed matter, and the forced execution of the printing.

A printing data transmission method according to a fifth mode for carrying out the present invention is a method of transmitting printing data to a printed matter preparation device which prepares a printed matter constituted of a plurality of pages while inserting a special sheet, a plurality of the special sheets constituting one set, into a designated page position sheet by sheet, the method comprising: a step of acquiring insertion information indicating the page position of the special sheet to be inserted into the printed matter; a step of judging whether or not an extra special sheet is generated if the printed matter is prepared in accordance with the insertion information and the number of special sheets constituting one set; and a step of notifying that the extra special sheet is generated, when it is judged that the extra special sheet is generated.

A printing data transmission apparatus according to a sixth mode for carrying out the present invention is a printing data transmission apparatus which transmits printing data to a printed matter preparation device to prepare a printed matter constituted of a plurality of pages while inserting a special sheet, a plurality of the special sheets constituting one set, into a designated page position sheet by sheet, the apparatus comprising: insertion information input means into which insertion information indicating the page position of the special sheet to be inserted in the printed matter is input; judgment means which judges whether or not an extra special sheet is generated if the printed matter is prepared in accordance with the insertion information and the number of special sheets constituting one set; and additional information generation means which processes the printing data for preparing the printed matter so that the extra special sheet is added to the end of the printed matter to generate the printed matter, when the judgment means judges that the extra special sheet is generated.

A printed matter preparation device according to a seventh mode for carrying out the present invention is a printed matter preparation device which prepares a printed matter constituted of a plurality of pages while inserting a special sheet, a plurality of the special sheets constituting one set, into a designated page position sheet by sheet, the device comprising: insertion information input means into which insertion information indicating the page position of the special sheet to be inserted in the printed matter is input; judgment means which judges whether or not an extra special sheet is generated if the printed matter is prepared in accordance with the insertion information and the number of special sheets constituting one set; additional information generation means which processes the printing data for preparing the printed matter so that the extra special sheet is added to the end of the printed matter to generate the printed matter, when the judgment means judges that the extra special sheet is generated; and printing means which prints an image on the special sheet in accordance with the insertion information.

According to an eighth mode for carrying out the present invention, there is provided a recording medium readable by a computer, in which a program is recorded for preparing a printed matter constituted of a plurality of pages while inserting a special sheet, a plurality of the special sheets constituting one set, into a designated page position sheet by sheet by a printed matter preparation device and for executing: a step of acquiring insertion information indicating the page position of the special sheet to be inserted into the printed matter; a step of judging whether or not an extra special sheet is generated if the printed matter is prepared in accordance with the insertion information and the number of special sheets constituting one set; and a step of preparing the printed matter so that the extra special sheet is added to the end of the printed matter to generate the printed matter, when it is judged that the extra special sheet is generated.

A printing data transmission method according to a ninth mode for carrying out the present invention is a method of transmitting printing data to a printed matter preparation device which prepares a printed matter constituted of a plurality of pages while inserting a special sheet, a plurality of the special sheets constituting one set, into a designated page position sheet by sheet, the method comprising: a step of acquiring insertion information indicating the page position of the special sheet to be inserted into the printed matter; a step of judging whether or not an extra special sheet is generated if the printed matter is prepared in accordance with the insertion information and the number of special sheets constituting one set; and a step of processing the printing data for preparing the printed matter so that the extra special sheet is added to the end of the printed matter to generate the printed matter, when it is judged that the extra special sheet is generated.

Further preferable modes for carrying out the present invention are as follows.

Still another mode for carrying out the present invention is a printing data transmission apparatus (100) which transmits printing data to an image forming device (10) having a function of preparing a printed matter constituted of a plurality of pages while inserting a special sheet, a plurality of the special sheets constituting one set, into a designated page position sheet by sheet, the apparatus comprising: insertion information input means (101) into which insertion information indicating the page position of the special sheet to be inserted in the printed matter is input; constituting sheet number acquisition means (102) for acquiring the number of special sheets constituting one set; judgment means (104) which judges whether-or not an extra special sheet is generated if the printed matter is prepared in accordance with the number of special sheets to be inserted in a case where the printed matter is printed in accordance with the insertion information input by the insertion information input means (101) and the number of special sheets constituting one set acquired by the constituting sheet number acquisition means (102); and notification means (105) which notifies a user that the extra special sheet is generated before starting the printing of the printed matter, when a judgment result of the judgment means (104) indicates the generation of the extra special sheet.

In accordance with the above-described mode, it is judged whether or not the extra special sheet is generated before the printing is executed. When the extra special sheet is generated, the use is notified to the effect. By an advance notification before the printing, it is possible for the user to take various measures. The printing data transmission apparatus (100) is constituted, for example, as a printer driver installed and executed on devices such as a personal computer.

Still another mode for carrying out the present invention is a printing data transmission apparatus (100) which transmits printing data to an image forming device (10) having a function of preparing a printed matter constituted of a plurality of pages while inserting a special sheet, a plurality of the special sheets constituting one set, into a designated page position sheet by sheet, the apparatus comprising: insertion information input means (101) into which insertion information indicating the page position of the special sheet to be inserted in the printed matter is input; constituting sheet number acquisition means (102) which acquires the number of special sheets constituting one set; judgment means (104) which judges whether or not an extra special sheet is generated if the printed matter is prepared in accordance with the number of special sheets to be inserted in a case where the printed matter is printed in accordance with the insertion information input by the insertion information input means (101) and the number of special sheets constituting one set acquired by the constituting sheet number acquisition means (102); and additional information generation means (106) which processes the printing data so as to add the extra special sheet to the end of the printed matter before the printing data of the printed matter is transmitted to the image forming device (10) in a case where a judgment result of the judgment means (104) indicates the generation of the extra special sheet.

In accordance with the mode, it is judged whether or not the extra special sheet is generated before the printing is executed. In a case where the extra special sheet is generated, the printing data is processed before the printing is executed so as to add the extra special sheet to the end of the printed matter. Accordingly, the extra special sheet is removed from the sheet feed section of the special sheets, and it is possible to appropriately perform the next printing. Since the printing data to be transmitted to the image forming device (10) is processed, the problem related to the generation of the extra special sheet can be solved also with respect to the existing image forming device (10).

Still another mode for carrying out the present invention is a printing data transmission apparatus (100) which transmits printing data to an image forming device (10) having a function of preparing a printed matter constituted of a plurality of pages while inserting a special sheet, a plurality of the special sheets constituting one set, into a designated page position sheet by sheet, the apparatus comprising: insertion information input means (101) into which insertion information indicating the page position of the special sheet to be inserted in the printed matter is input; constituting sheet number acquisition means (102) which acquires the number of special sheets constituting one set; judgment means (104) which judges whether or not an extra special sheet is generated when the printed matter is prepared in accordance with the number of special sheets to be inserted in a case where the printed matter is printed in accordance with the insertion information input by the insertion information input means (101) and the number of special sheets constituting one set acquired by the constituting sheet number acquisition means (102); notification means (105) which notifies a user to the effect before the printing of the printed matter is started in a case where a judgment result of the judgment means (104) indicates the generation of the extra special sheet; selection acceptance means (103) for accepting selection of a measure from a plurality of choices including re-input of the insertion information, automatic addition to add the extra special sheet to the end of the printed matter, and forced execution of the printing, when the notification means (105) notifies the user of the generation of the extra special sheet; and additional information generation means (106) for processing the printing data so as to add the extra special sheet to the end of the printed matter, when the selection acceptance means (103) accepts the selection of the automatic addition.

In accordance with the mode, it is judged whether or not the extra special sheet is generated before the execution of the printing. In a case where the extra special sheet is generated, the user is notified to the effect, and a selection operation of the measure is accepted from the user. For example, in a case where the re-input of the insertion information is selected, the user can modify the insertion information so as to insert the extra special sheet to the end of the printed matter. In a case where the insertion information of the special sheet is incorrectly input, it is possible to change the incorrect input to a correct setting.

In a case where the automatic addition is selected, the extra special sheet is automatically added to the end of the printed matter, and therefore the problem is solved without troubling the user. The forced execution may be selected, for example, before or after the printing in a case where the extra special sheet is removed from the sheet feed section by the user.

Still another mode for carrying out the present invention is an image forming system (5) comprising: an image forming device (10) including a function of preparing a printed matter constituted of a plurality of pages while inserting the plurality of special sheet constituting one set into a designated page position sheet by sheet; and the any of the printing data transmission apparatuses (100).

In accordance with the mode, there is provided the image forming system (5) in which it is judged whether or not the extra special sheet is generated before the execution of the printing, and various measures can be taken in advance.

Still further mode for carrying out the present invention is a printing control method of controlling printing by an image forming device (10) including a function of preparing a printed matter constituted of a plurality of pages while inserting a special sheet, a plurality of the special sheets constituting one set, into a designated page position sheet by sheet, the method comprising: a stage of inputting insertion information indicating the page position of the special sheet to be inserted in the printed matter; a stage of acquiring the number of special sheets constituting one set; a stage of judging whether or not an extra special sheet is generated when the printed matter is prepared from the number of special sheets to be inserted in a case where the printed matter is printed in accordance with the insertion information and the number of special sheets constituting one set; and a stage of notifying a user to the effect in a case where a judgment result of the judgment means (104) indicates the generation of the extra special sheet, wherein these stages are performed before starting the printing of the printed matter.

In accordance with the mode, it is judged whether or not the extra special sheet is generated before the execution of the printing. In a case where the extra special sheet is generated, the user is notified to the effect. Accordingly, it is possible for the user to select the measure before the execution of the printing.

Still further mode for carrying out the present invention is a printing control method of controlling printing by an image forming device (10) including a function of preparing a printed matter constituted of a plurality of pages while inserting a plurality of special sheets constituting one set into a designated page position sheet by sheet, the method comprising: a stage of inputting insertion information indicating the page position of the special sheet to be inserted in the printed matter; a stage of acquiring the number of special sheets constituting one set; a stage of judging whether or not an extra special sheet is generated if the printed matter is prepared from the number of special sheets to be inserted in a case where the printed matter is printed in accordance with the insertion information and the number of special sheets constituting one set; and a stage of processing the printing data of the printed matter so as to add the extra special sheet to the end of the printed matter in a case where a judgment result of the judgment means (104) indicates the generation of the extra special sheet, wherein these stages are performed before starting the printing of the printed matter.

In accordance with the mode for carrying out the present invention, it is judged whether or not the extra special sheet is generated before the execution of the printing. In a case where the extra special sheet is generated, the printing data is processed before the execution of the printing so as to add the extra special sheet to the end of the printed matter. Accordingly, the extra special sheet is removed from the sheet feed section of the special sheet, and it is possible to appropriately perform the next printing. Since the printing data to be sent to the image forming device (10) is processed, the problem related to the generation of the extra special sheet can be solved even with respect to the existing image forming device (10).

BRIEF DESCRIPTION OF THE DRAWINGS

FIG. 9 is an explanatory view showing one example of a warning screen displayed by the printing data transmission apparatus according to the embodiment of the present invention; and FIG. 10 is an explanatory view showing one example of a warning selection screen displayed by the printing data transmission apparatus according to the embodiment of the present invention.

DETAILED DESCRIPTION OF THE PREFERRED EMBODIMENTS

The present invention will be described hereinafter with reference to the drawings.

Figure 1:
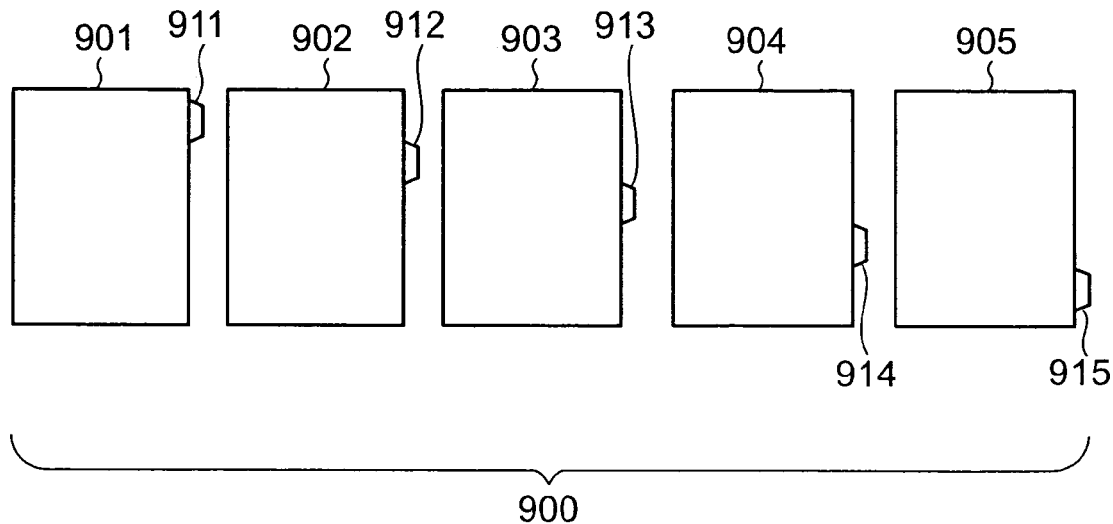
FIG. 1 is an explanatory view showing one example of a tab paper which is one example of a special paper including five sheets constituting one set to be inserted in a printed matter in a printed matter preparation device according to the present invention.
Figure 2:
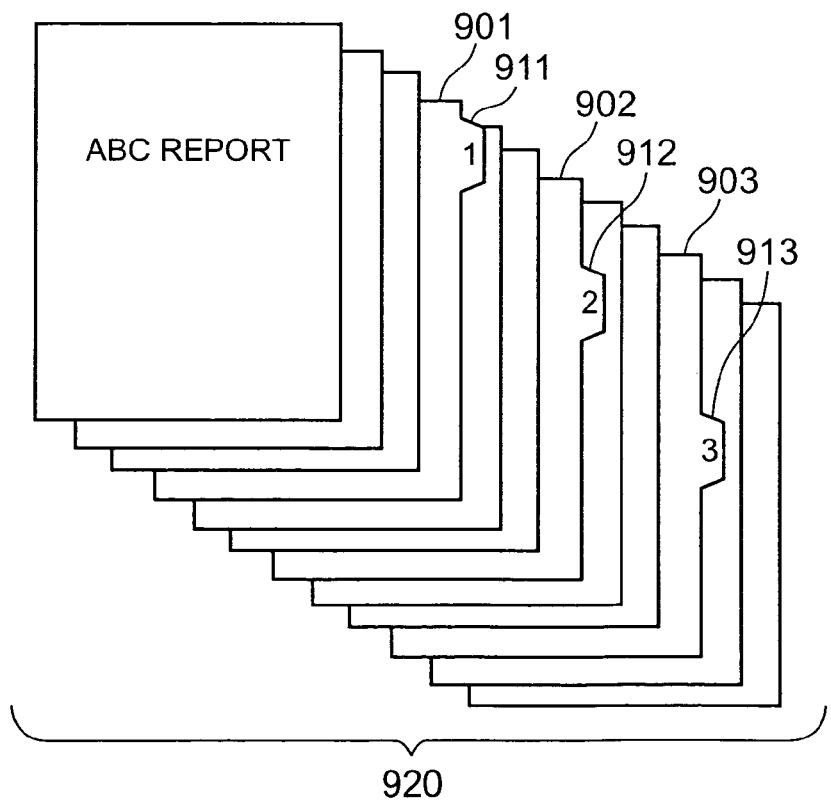
FIG. 2 is an explanatory view showing one example of the printed matter in a state in which three tab sheets are inserted between pages in the present invention.
Figure 3:
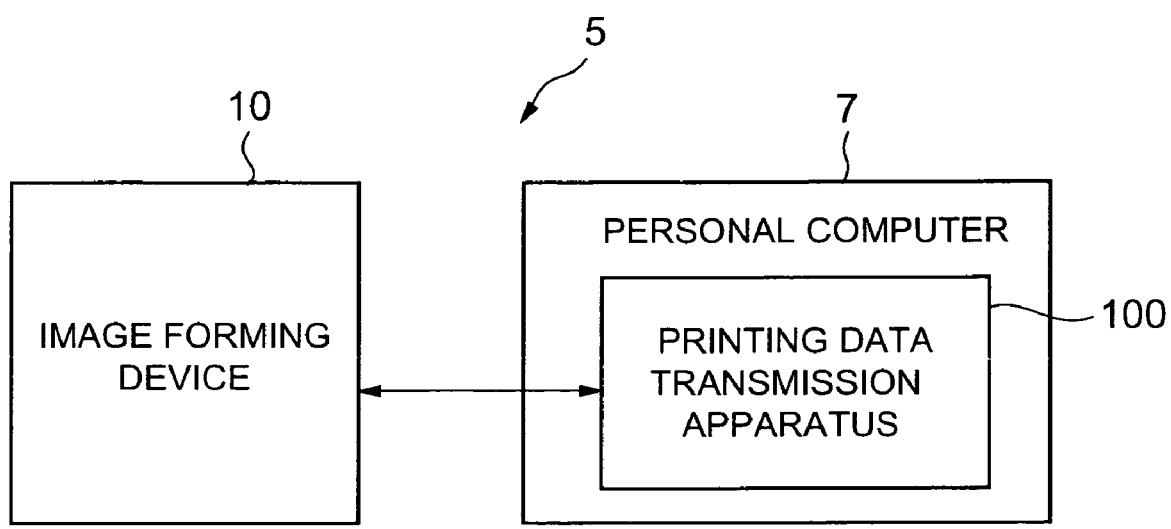
FIG. 3 is a block diagram showing a system constitution of an image forming system according to an embodiment of the present invention.

FIG. 3 shows a constitution of an image forming system according to the embodiment of the present invention. An image forming system 5 is constituted of an image forming device 10 which is one example of a printed matter preparation device and a printing data transmission apparatus 100. The image forming device 10 has a scanner function of reading a draft image, a copy function of reading a draft and forming and outputting a duplicate of the draft on a recording sheet, a facsimile function of transmitting/receiving image data with respect to a remote device, a printer function of printing based on printing data input from a personal computer. In general, the device is referred to as a digital copying machine. The device also includes a function of inserting special sheets such as tab sheets shown in FIG. 1 into page positions designated by a user to prepare a printed matter shown in FIG. 2. In the present invention, a special paper refers to a plurality of sheets constituting one set, and includes, for example, a tab paper, or color sheets having different colors. In the embodiment, the use of the tab paper as the special paper will be described.

The printing data transmission apparatus 100 includes a function of transmitting printing data prepared by use of document preparation software to printers such as the image forming device 10. Here, the apparatus is constituted as a printer driver installed and executed in a personal computer 7. The personal computer 7 including the printing data transmission apparatus 100 is connected to the image forming device 10 via networks such as a local area network (LAN).

Figure 4:
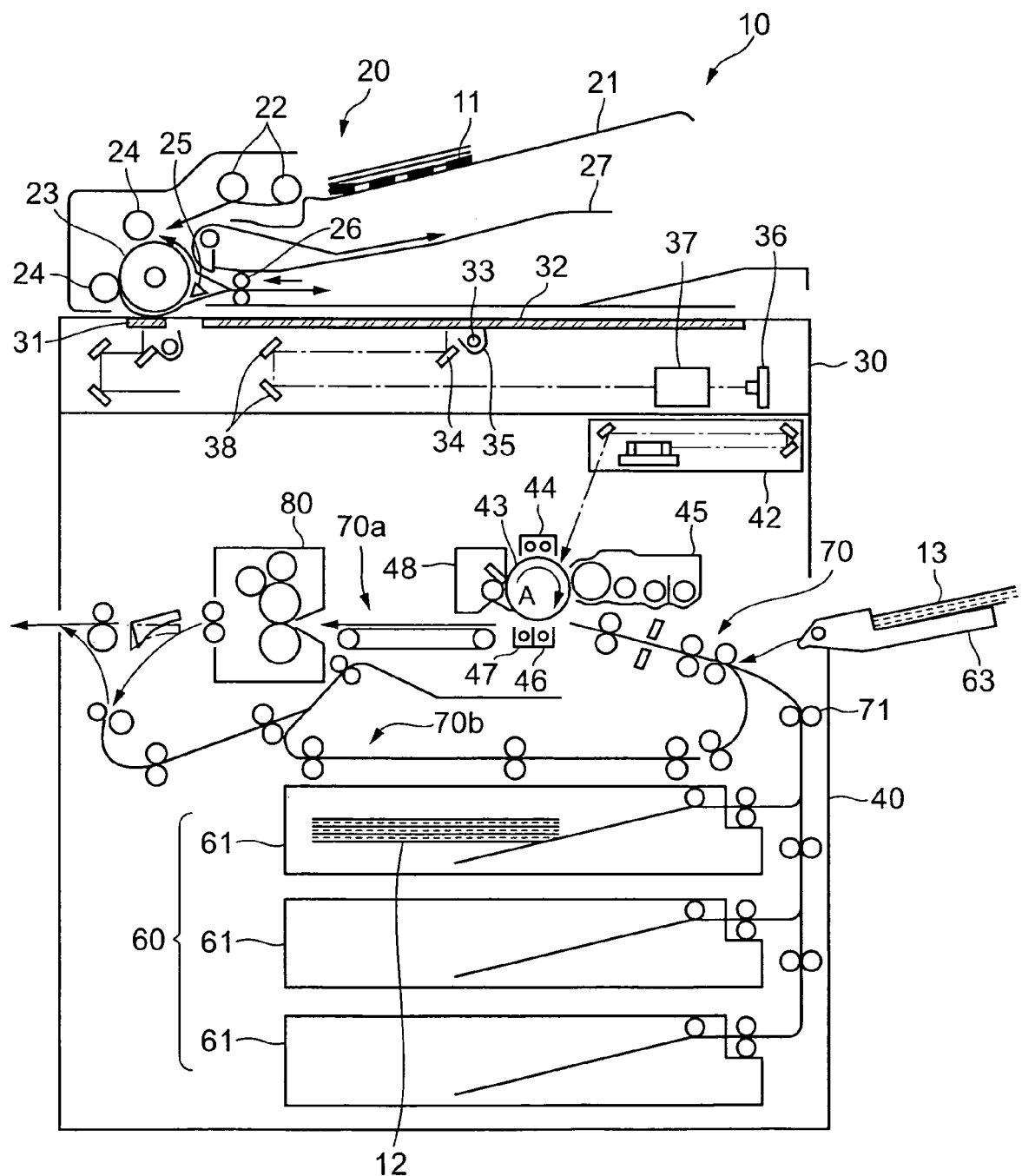
FIG. 4 is a sectional view showing an image forming device which is one example of the printed matter preparation device included in the image forming system according to the embodiment of the present invention.

FIG. 4 shows a sectional constitution of the image forming device 10. As shown in FIG. 4, the image forming device 10 comprises an automatic draft feed unit 20, a reader section 30, and a printer section 40. The automatic draft feed unit 20 performs a function of feeding a draft 11 stacked on a draft laying tray 21 sheet by sheet into a reading place of the reader section 30. The unit also includes a function of reversing front/back of a double-surface draft and feeding the draft again into the reader section 30 after reading a single surface.

The reader section 30 performs a function of reading the draft fed by the automatic draft feed unit 20 and outputting corresponding image data. The reader section 30 comprises: an exposure scanning section 35 including a light source 33 and a mirror 34; a line image sensor 36 which receives a reflected light from the draft to output an electric signal in accordance with a light intensity; a condenser lens 37 which condenses the reflected light from the draft onto the line image sensor 36; and various mirrors 38 which forms an optical path for guiding the reflected light from the mirror 34 of the exposure scanning section 35 to the line image sensor 36.

The printer section 40 forms an image on a recording sheet in accordance with image data obtained by reading the draft by the reader section 30 or image data obtained by developing printing data received from the personal computer 7 or the like into a raster image by an electronic photograph process. Here, the printer section is constituted as a laser printer by use of the electronic photograph process.

The image is formed as follows. A photosensitive body 43 rotates in a certain direction (arrow A direction in the figure), and the surface of the body is uniformly charged by a charging unit 44. A laser unit 42 irradiates the surface of the charged photosensitive body 43 with a laser light which turns ON/OFF in accordance with the image data to form an electrostatic latent image. A developing unit 45 visualizes the electrostatic latent image formed on the surface of the photosensitive body 43 with a toner. This toner image is transferred to a recording sheet conveyed from a sheet feed section 60 described later by a transfer unit 46. The recording sheet to which the toner image has been transferred is separated from the photosensitive body 43 by a separation unit 47. Thereafter, the toner image is fixed when the sheet passes through a fixing unit, and the sheet is discharged to the device. Toner remaining on the surface of the photosensitive body 43 after the transfer is removed and collected by a cleaning unit 48.

The sheet feed section 60 includes a plurality of sheet feed cassettes 61 and a manual feed tray 63, and performs a function of feeding the sheets contained and laid in these sheet by sheet in order. The sheet feed cassettes 61 contain recording sheets 12 having fixed sizes such as A4 and B4. The manual feed tray 63 performs a function of feeding sheets having special sizes or thicknesses. Tab sheets 13 are usually fed from the manual feed tray 63.

A conveyance section 70 comprises: a usual path 70a which allows sheets such as the recording sheets 12 or the tab sheets 13 fed from the sheet feed cassettes 61 or the manual feed tray 63 to pass through a transfer position between the photosensitive body 43 and the transfer unit 46 and which discharges the sheets to a discharge sheet tray outside the device through a fixing unit 80 downstream; and a reverse path 70b which joins the usual path 70a again upstream from a transfer place after reversing a front/back of the sheet passed through the fixing unit 80. The respective paths 70a, 70b include a large number of conveyance rollers 71 at an interval which is shorter than a feed direction size of a transfer sheet having a minimum size.

The image forming device 10 recognizes that the sheet being conveyed is the tab sheet 13 when forming the image on the tab sheet 13, so that jam is prevented from being incorrectly detected by the presence of a tab portion.

Figure 5:
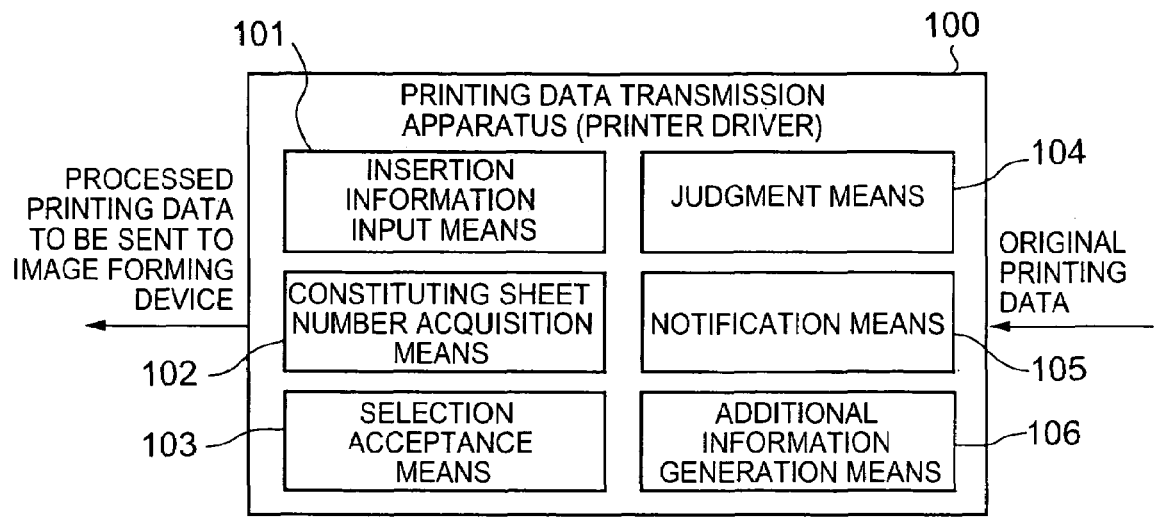
FIG. 5 is a block diagram showing a function constitution of a printing data transmission apparatus according to the embodiment of the present invention.

FIG. 5 shows a function constitution of the printing data transmission apparatus 100. The printing data transmission apparatus 100 includes various functions related to the tab sheets in addition to a general function of adding various control information to printing data prepared by the use of the document preparation software or the like to transmit the information to the image forming device 10 as the printer driver. Insertion information input means 101 performs a function of accepting designation of a page position for inserting the tab sheet into the printed matter from the user. Constituting sheet number acquisition means 102 performs a function of acquiring the number of tab sheets constituting one set. Here, a tab sheet setting screen 200 described later is displayed in a display of the personal computer 7, and a setting operation of the number of tab sheets constituting one set is accepted.

Judgment means 104 performs a function of judging whether or not an extra tab sheet is generated in a case where the prior printed matter is actually prepared from the number of tab sheets to be inserted in a case where the printed matter is printed in accordance with insertion information input by the insertion information input means 101 and the number of tab sheets constituting one set acquired by the constituting sheet number acquisition means 102. Concretely, assuming that the number of tab sheets to be inserted into the printed matter is N, and the number of tab sheets constituting one set is M, N is divided by M, and it is judged whether or not the extra tab sheet is generated based on whether a remainder is generated. When the remainder is generated, the extra tab sheets are generated, and the number of sheets is (M-A) sheets assuming that a value of the remainder obtained by dividing N by M is A.

In a case where a judgment result of the judgment means 104 indicates the generation of the extra tab sheets, notification means 105 performs a function of notifying a user to the effect before start of the printing. Here, a warning screen 400 or the like described later is displayed in the display of the personal computer 7 and is notified. Additional information generation means 106 performs a function of processing the printing data so as to add the extra tab sheet to the end of the printed matter. For example, the processing is performed such that a control code to switch a sheet feeder to the manual feed tray 63 and the number of new page codes corresponding to that of extra sheets are added to the end of the printing data.

Selection acceptance means 103 performs a function of accepting selection of a measure from the user, when the generation of extra tab sheets is notified to the user. The user can select the measure from three choices including re-input of the insertion information, automatic addition to automatically add the extra tab sheet to the end of the printed matter, and forced execution of the printing.

Figure 6:
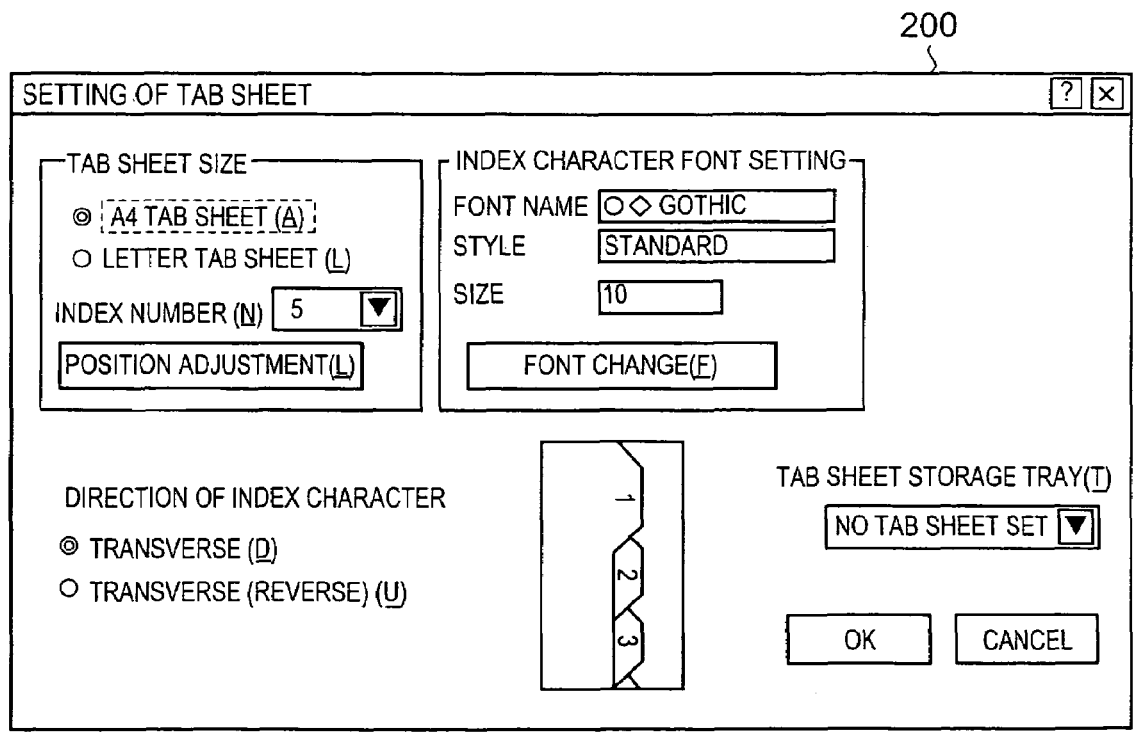
FIG. 6 is an explanatory view showing one example of a tab sheet setting screen displayed by the printing data transmission apparatus according to the embodiment of the present invention.

FIG. 6 shows a tab sheet setting screen on which the number of tab sheets constituting one set and the like are set. The tab sheet setting screen 200 is displayed in the display of the personal computer 7 by the constituting sheet number acquisition means 102. It is possible to select a size of the tab sheet, the number of tab sheets constituting one set (the number of indexes), a type or size of a font of an index character to be printed on a tab, a direction of the index character, a tray of the sheet feeder of the tab sheet (storage tray) and the like from this screen 200. The number of tab sheets constituting one set (the number of indexes) is selectable in a range of "3" to "9", and a standard is "5". In FIG. 6, the number of tab sheets constituting one set (the number of indexes) is set to "5".

Figure 7:
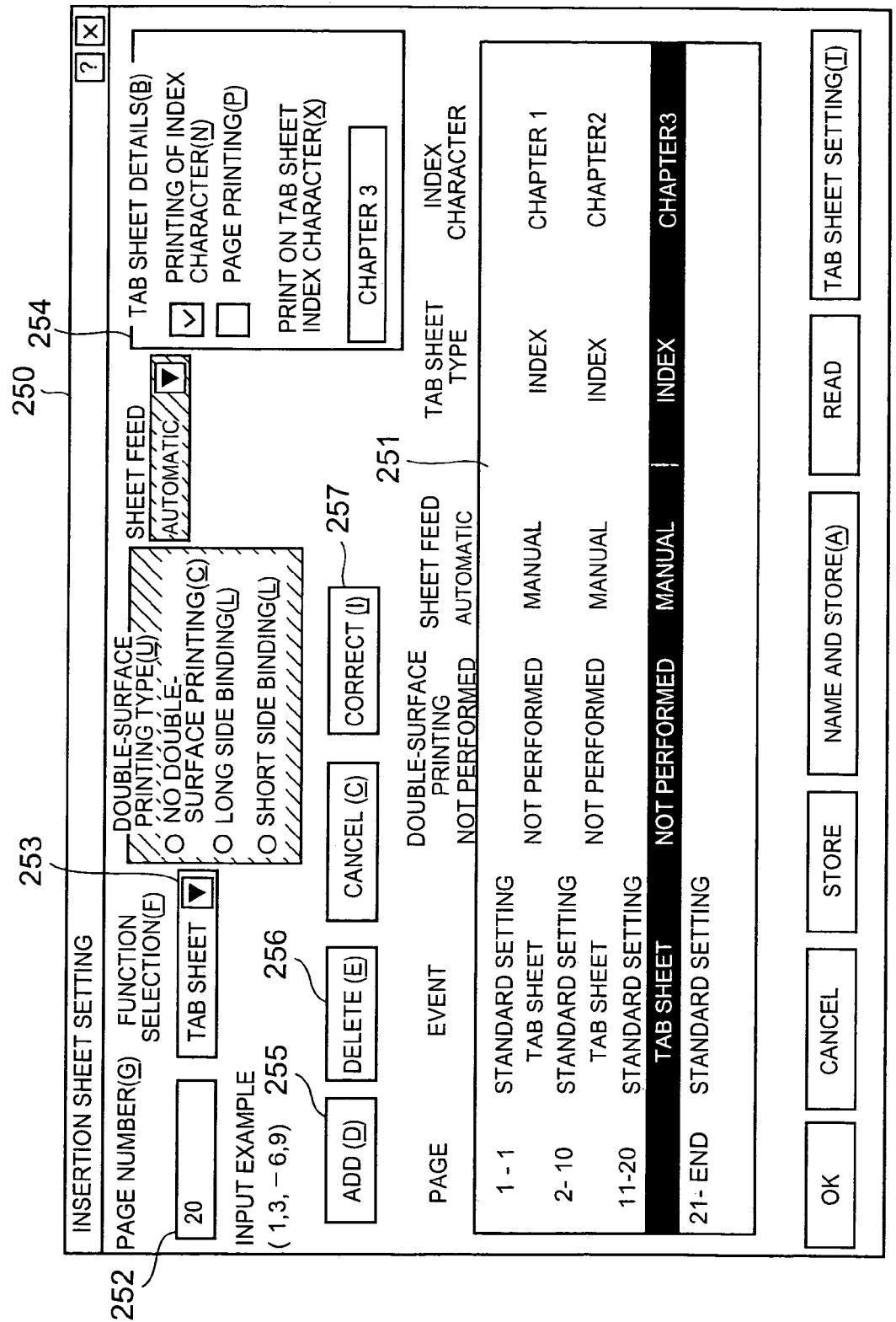
FIG. 7 is an explanatory view showing one example of an insertion sheet setting screen displayed by the printing data transmission apparatus according to the embodiment of the present invention.

FIG. 7 shows an insertion sheet setting screen to set the page position or the like into which the tab sheet is inserted. An insertion sheet setting screen 250 is displayed in the display of the personal computer 7 by the insertion information input means 101. On the screen 250, the insertion information is set such as page numbers, the type of a recording sheet, a double-surface or a single-surface, and the sheet feeder to feed the sheet. Setting contents are displayed in an insertion information display column 251 of a lower part of the screen.

To set the insertion information, first a page range or page position is set in a column 252 of "page number", it is set whether or not the recording sheet is the tab sheet in a column 253 of "function selection", and whether or not to print the index character on the tab and the content of the index character are set in a column 254 of "tab sheet details". After performing this setting, an "add" button 255 is operated to add the set content to the insertion information, and the information is additionally displayed in the insertion information display column 251. Moreover, to correct or delete the once set content, a change desired place in the insertion information display column 251 is clicked and reversed/displayed. In this state, a "delete" button 256 or a "correct" button 257 may be operated.

In the example of FIG. 7, settings are made so as to insert the tab sheets between pages 1 and 2 of the draft to be printed, between pages 10 and 11, and between pages 20 and 21.

Figure 8:
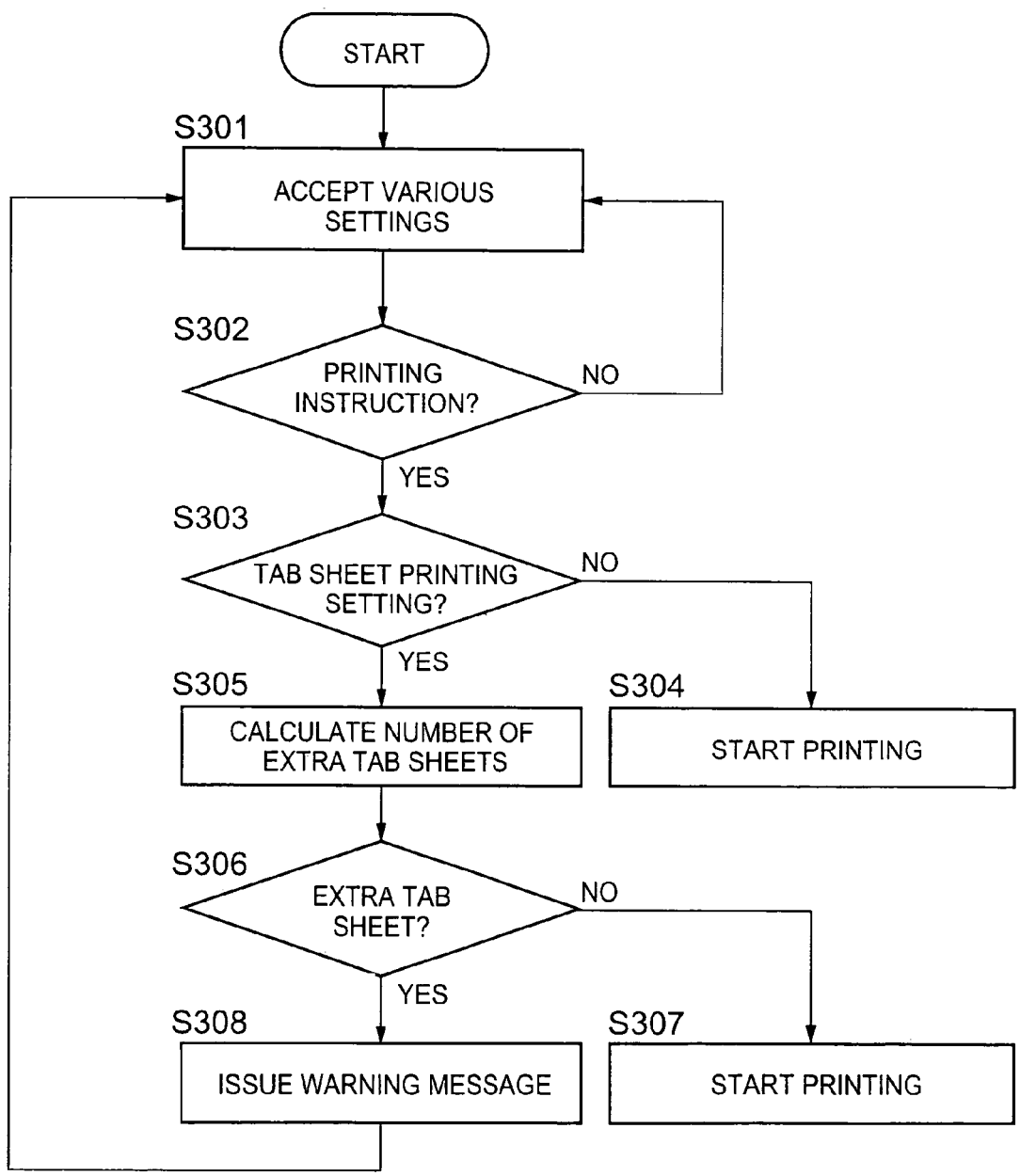
FIG. 8 is a flowchart showing an operation in a case where the printing data transmission apparatus according to the embodiment of the present invention accepts a setting related to the tab sheet and the printed matter is printed.

FIG. 8 shows a flow of a process in performing the setting related to the tab sheet to print the printed matter. First, the insertion information an various printing conditions are set through the tab sheet setting screen 200, insertion sheet setting screen 250, and another setting screen (step S301). Thereafter, when a printing execute button (not shown) is operated (step S302: Y), it is checked whether or not the insertion of the tab sheets is set in this printing (step S303). When the insertion of the tab sheets is not set (step S303: N), the printing is started (step S304).

When the insertion of the tab sheets is set (step S303: Y), it is calculated whether or not the extra tab sheets are generated (step S305). That is, assuming that the number of insertion tab sheets set in the insertion sheet setting screen 250 is N, and the number of tab sheets, constituting one set (the number of indexes) set in the tab sheet setting screen 200 is M, N is divided by M to obtain a value A of a remainder. The number of extra tab sheets is (M-A).

When the remainder value A is "0", any extra tab sheet is not generated (step S306: N), and therefore the printing is started (step S307). When the remainder value A is not "0", and the extra tab sheets are generated (step S306: Y), the warning screen 400 shown in FIG. 9 is pop-up displayed and notified to the effect (step S308), and thereafter the screen returns to the setting screen to accept correction of the printing conditions (step S301). In the warning screen 400, a warning message 401 indicating that the extra tab sheets are generated, detailed information 402 indicating the number of extra tab sheets and the like, and an "OK" button 403 for accepting a confirmation operation of a warning content are displayed. When the operation of the "OK" button 403 is confirmed as the confirmation operation, a screen is displayed in the tab sheet setting screen 200 shown in FIG. 6 or the insertion sheet setting screen 250 shown in FIG. 7 to request the user to correct the number (N) of indexes of tab sheets or to add, correct, or delete an insertion page number of tab sheets. The user corrects the index number of tab sheets, or adds, corrects, or deletes the insertion page number of tab sheets. To correct the index number of tab sheets, the tab sheets 13 set in the manual feed tray 63 are changed to the tab sheets whose number constituting one set is suitable for the number of tab sheets to be inserted. When the addition, correction, or deletion of the insertion page number of tab sheets, or the correction of the index number of tab sheets is accepted, the extra tab sheets can be inhibited from being generated. Especially, when the correction of the index number of tab sheets is accepted, the extra tab sheets are inhibited from being generated, and the tab sheet can be inserted into a desired position.

FIG. 10 shows a warning selection screen 420 which provides notification and choices of measures in a case where the extra tab sheets are generated to accept the selection. In the warning selection screen 420, a warning message 421 indicating that the extra tab sheets are generated, detailed information 422 indicating the number of extra tab sheets, and selection buttons 423 to 425 for selecting the measure are displayed.

The "re-set" button 423 corresponds to the "OK" button 403 of the warning screen 400. When this button is operated, the screen returns to the setting screen such as the insertion sheet setting screen 250 or the tab sheet setting screen 200, and the printing conditions can be set again. When the "forced execution" button 425 is operated, the printing is executed with the existing settings. In this case, the user performs preparations such as removing of the extra tab sheets from the manual feed tray 63 for the next printing.

When the "automatic addition" button 424 is operated, the extra tab sheets are automatically added to the end of the printed matter to be printed this time. For example, when the setting is made so as to insert three tab sheets between the pages of the printed matter among one set of five tab sheets, a surplus of two tab sheets is added to the end of the printed matter.

The automatic addition is performed by processing the printing data to be transmitted to the image forming device 10. Concretely, a process is performed so as to add the control code for switching the sheet feeder to the manual feed tray 63 or the like in which the tab sheets are set, and the number of new page codes corresponding to that of extra tab sheets to the end of the printing data.

In a case where the extra tab sheets are generated, the user is notified to the effect that the extra tab sheets are generated in this manner, and therefore the user can take various measures. Especially in a case where the extra tab sheets are generated, the user is notified to the effect that the extra tab sheets are generated before the printing data is transmitted to the image forming device 10. Then, the user can take various measures before the printing. Moreover, when the printing data is processed so as to add the extra tab sheets to the end of the printed matter, and the processed printing data is transmitted to the image forming device, the problem related to the extra tab sheets is solved in a stage of transmission of the printing data to the image forming device 10. Therefore, it is not necessary to dispose a function of expelling the extra tab sheets on an image forming device 10 side, and the problem related to the generation of the extra tab sheets can be solved even with respect to the existing device type which does not have this function.

The embodiment of the present invention has been described above with reference to the drawings, but a concrete constitution is not limited to the embodiment, and the present invention includes modifications or additions that do not depart from the scope of the present invention. For example, the present embodiment is constituted such that the user sets the number of tab sheets constituting one set from the tab sheet setting screen 200, but information indicating the number of sheets constituting one set may also be received from the image forming device 10 side. That is, the image forming device 10 may also be provided with a sensor for sensing the number of tab sheets constituting one set, or the image forming device 10 may be constituted such that the number of tab sheets constituting one set can be input from an operation panel. In this manner, the number of sheets constituting one set may be grasped on the image forming device 10 side, and the information may be received from the image forming device 10 by the printing data transmission apparatus 100.

Moreover, in the present embodiment, the warning selection screen 420 is displayed. When the "automatic addition" button 424 in this screen is operated, the extra tab sheets are automatically added to the end of the printed matter. However, the extra tab sheets may be automatically added to the end of the printed matter after or without issuing a warning in a case where the extra tab sheets are generated.

In accordance with the printed matter preparation device, and the printing data transmission method and apparatus of the present invention, in a case where extra special sheets are generated in preparing the printed matter by the insertion of the special sheets such as a plurality of tab sheets constituting one set into designated page positions, the user is notified to the effect, and therefore a room for the selection of the measure can be given to the user.

When the printing data is processed before the execution of the printing so as to add the extra special sheets to the end of the printed matter in the generation of the extra special sheet, the extra special sheets are automatically removed from the sheet feed section of the special sheets, and it is possible to appropriately perform the next printing. Moreover, when the printing data to be sent to the image forming device is processed, the problem related to the extra special sheets is solved in a stage of transmission of the printing data to the image forming device or the like. Therefore, even with respect to the existing image forming device, the problem related to the generation of the extra special sheets can be solved.

What is claimed is:

1. A printing data transmission apparatus which transmits printing data to a printed matter preparation device to prepare a printed matter constituted of a plurality of pages while inserting a special sheet, a plurality of the special sheets constituting one set, into a designated page position sheet by sheet, the apparatus comprising:

insertion information input means into which insertion information indicating the page position of the special sheet to be inserted in the printed matter is input;

judgement means which judges whether or not an extra special sheet is generated if the printed matter is prepared in accordance with the insertion information and the number of special sheets constituting one set;

notification means which notifies that the extra special sheet is generated, when the judgment means judges that the extra special sheet is g generated, the notification means comprises display means, and the display means displays information indicating a request for selection from a plurality of choices including at least one of re-input of the insertion information, re-setting of the number of special sheets constituting one set, automatic addition to add the extra special sheet to the end of the printed matter, and forced execution of the printing, when the judgment means judges that the extra special sheet is generated; and selection acceptance means which accepts selection from a plurality of choices including at least one of re-input of the insertion information, re-setting of the number of special sheets constituting one set, automatic addition to add the extra special sheet to the end of the printed matter, and forced execution of the printing, when the judgment means judges that the extra special sheet is generated.

2. The printing data transmission apparatus according to claim 1, further comprising:

additional information generation means which processes the printing data for preparing the printed matter so as to add the extra special sheet to the end of the printed matter, when the plurality of choices include at least the automatic addition and the selection acceptance means selects the automatic addition.

3. A recording medium readable by a computer, in which a program is recorded for preparing a printed matter constituted of a plurality of pages while inserting a special sheet, a plurality of the special sheets constituting one set, into a designated page position sheet by sheet by a printed matter preparation device and for executing:

a step of acquiring insertion information indicating the page position of the special sheet to be inserted into the printed matter;

a step of judging whether or not an extra special sheet is generated if the printed matter is prepared in accordance with the insertion information and the number of special sheets constituting one set;

a step of notifying that the extra special sheet is generated, when it is judged that the extra special sheet is generated;

a step of displaying information indicating a request for selection from a plurality of choices including at least one of re-input of the insertion information, re-setting of the number of special sheets constituting one set, automatic addition to add the extra special sheet to the end of the printed matter, and forced execution of the printing, when the judgment means judges that the extra special sheet is generated; and a step of accepting selection from a plurality of choices including at least one of re-input of the insertion information, re-setting of the number of special sheets constituting one set, automatic addition to add an extra special sheet to the end of the printed matter, and forced execution of the printing, when it is judged that the extra special sheet is generated.

4. The recording medium according to claim 3, wherein the plurality of choices include at least the automatic addition, and the acceptance step further comprises: a step of processing the printing data for preparing the printed matter so as to add the extra special sheet to the end of the printed matter, when the automatic addition is selected.

5. A printing data transmission method of transmitting printing data to a printed matter preparation device which prepares a printed matter constituted of a plurality of pages while inserting a special sheet, a plurality of the special sheets constituting one set, into a designated page position sheet by sheet, the method comprising:

a step of acquiring insertion information indicating the page position of the special sheet to be inserted into the printed matter;

a step of judging whether or not an extra special sheet is generated if the printed matter is prepared in accordance with the insertion information and the number of special sheets constituting one set;

a step of notifying that the extra special sheet is generated, when it is judged that the extra special sheet is generated;

a step of displaying information indicating a request for selection from a plurality of choices including at least one of re-input of the insertion information, re-setting of the number of special sheets constituting one set, automatic addition to add the extra special sheet to the end of the printed matter, and forced execution of the printing when the judgment means judges that the extra special sheet is generated; and a step of accepting selection from a plurality of choices including at least one of re-input of the insertion information, re-setting of the number of special constituting one set, automatic addition to add an extra special sheet to the end of the printed matter, and forced execution of the printing, when it is judged that the extra special sheet is generated.

6. The printing data transmission method according to claim 5, wherein the plurality of choices include at least the automatic addition, and the step of accepting selection further comprises: a step of processing the printing data for preparing the printed matter so as to add the extra special sheet to the end of the printed matter, when the automatic addition is selected.

* * * * *